(No Model.) 2 Sheets—Sheet 1.

A. G. NEVILLE.
MOLD FOR BLOWING GLASS.

No. 529,665. Patented Nov. 20, 1894.

Witnesses
Albert Sheridan
Van Buren Hillyard

Inventor
Asa G. Neville
By Attorneys R. S. & A. B. Lacey (No Model.) 2 Sheets—Sheet 2.

A. G. NEVILLE.
MOLD FOR BLOWING GLASS.

No. 529,665. Patented Nov. 20, 1894.

Witnesses
Albert Speiden
Van Buren Hillyard

Inventor,
Asa G. Neville,
By Attorneys R.S.&A.B.Lacey

UNITED STATES PATENT OFFICE.

ASA G. NEVILLE, OF BLAIRSVILLE, PENNSYLVANIA.

MOLD FOR BLOWING GLASS.

SPECIFICATION forming part of Letters Patent No. 529,665, dated November 20, 1894.

Application filed June 24, 1893. Serial No. 478,707. (No model.)

*To all whom it may concern:*

Be it known that I, ASA G. NEVILLE, a citizen of the United States, residing at Blairsville, in the county of Indiana, State of Pennsylvania, have invented certain new and useful Improvements in Molds for Blowing Glassware; and I do hereby declare the following to be a full, clear, and exact description of the invention, such as will enable others skilled in the art to which it appertains to make and use the same.

My invention relates to glass molds principally designed for forming hollow blown glassware, and like my former patent, No. 443,403, will be used in the manufacture of shades, globes and chimneys and other ware that is now being made in the iron mold, paste mold and by hand.

The object of the invention is to form any article of blown glassware so that one portion of it can be made figured or of a rosette pattern and the remaining portion perfectly seamless.

A further object of the invention is the manufacture of a given article or two articles at one time in a sectional mold, one section being stationary, the other adapted to turn.

A still further object of the invention is to make dome-ring top or other like shades with the ring or top figured and the balance of the shade with a perfectly smooth seamless body. By the present process of manufacturing these shades or articles they are blown in an iron mold which must necessarily be opened from top to bottom to deliver the article from the mold. This being done it leaves a very objectionable seam on the article after it is finished. To overcome this under my process I have the mold made in separate sections, a figured section which is composed of two, three or four parts, and a plain section which is also made up of two or more parts. These sections are separate and independent and may be considered as two distinct molds.

The improvement consists of the novel features and the peculiar construction and combination of the parts which will be hereinafter more fully described and claimed and which are shown in the annexed drawings, in which—

Figure 1:
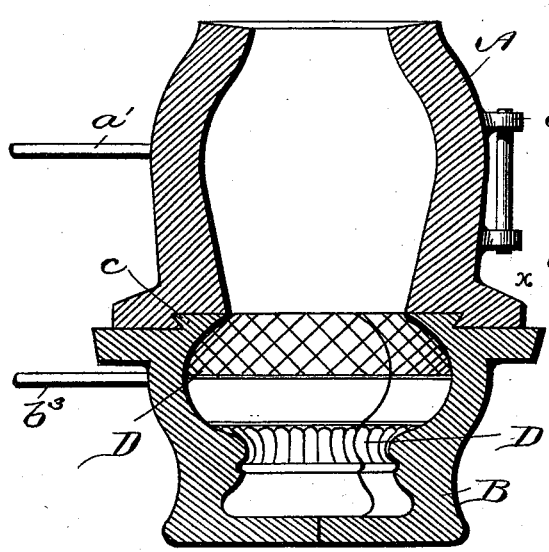
Figure 2:
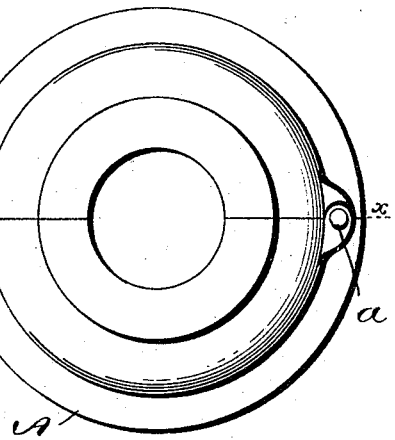
Figure 3:
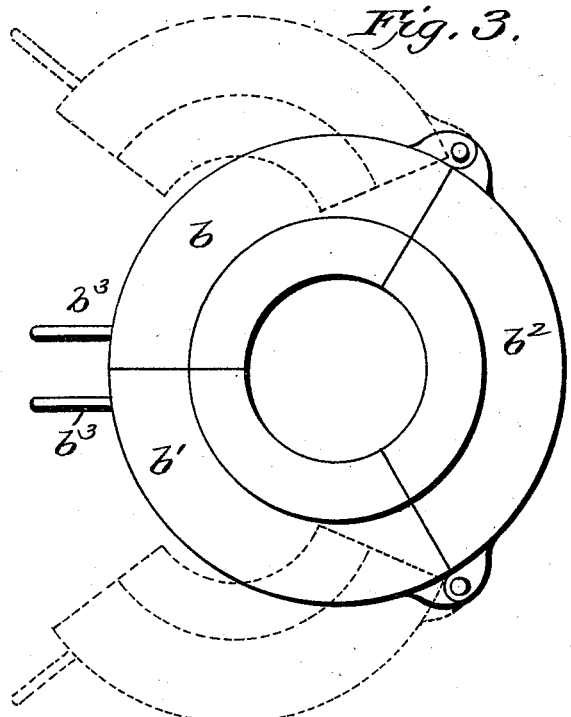
Figure 4:
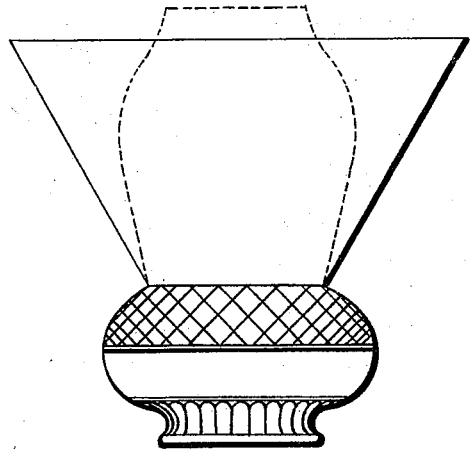
Figure 5:
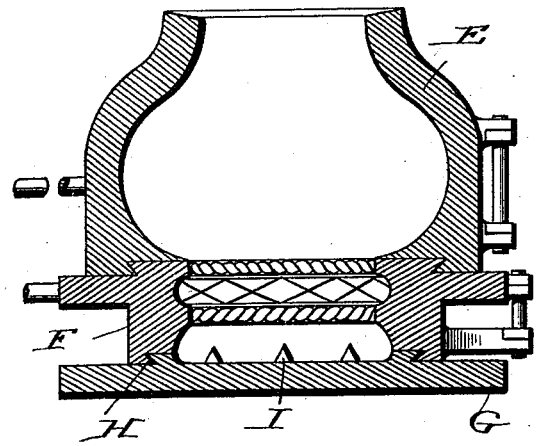
Figure 6:
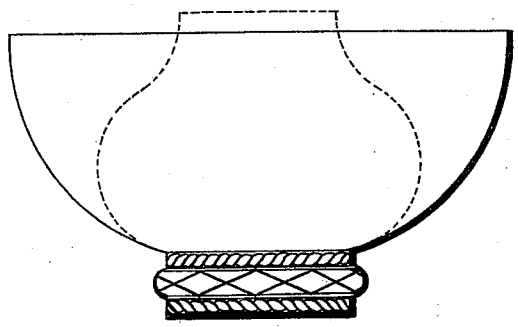
Figure 7:
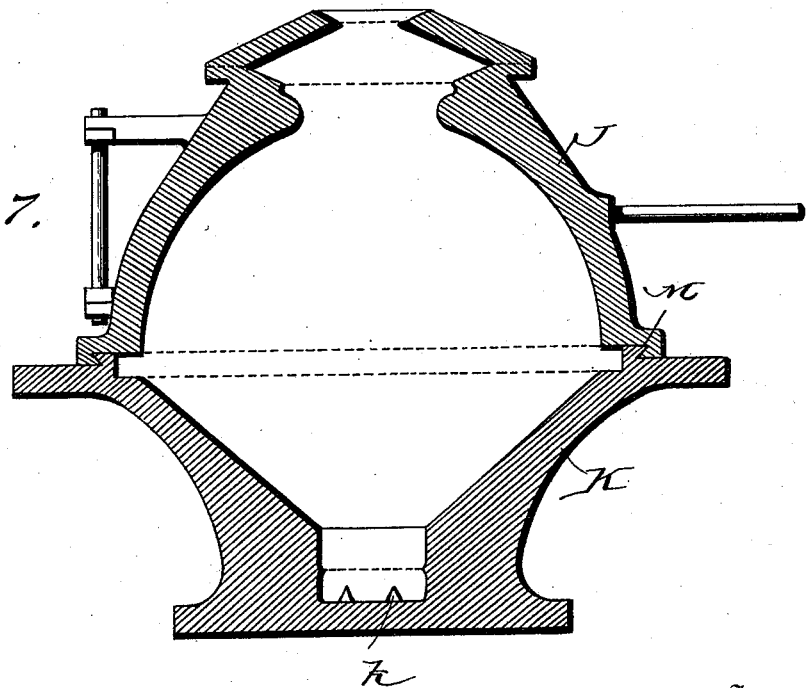

Figure 1 is a vertical section on the line X—X of Fig. 2 of a mold for making shades, embodying my invention. Fig. 2 is a top plan view of the mold shown in Fig. 1. Fig. 3 is a top plan view of the lower section of the mold, the top section being removed, the said section being composed of three parts which are hinged together, the two extreme sections being shown open by dotted lines. Fig. 4 is a side elevation of a shade made in the mold shown in Figs. 1, 2, and 3, the full lines showing the completed shade, the dotted lines the form of the shade as it comes from the mold and prior to the process of flaring. Fig. 5 is a section of a ring top dome mold, the lower section resting on or provided with a removable bottom. Fig. 6 is a side elevation of a shade made in the mold shown in Fig. 5, the full lines showing the shade in its completed form and the dotted lines the outline as it comes from the mold. Fig. 7 is a sectional detail of a double mold for making two shades at one operation, the lower mold or section being fixed or stationary and the upper mold or section adapted to turn.

The mold will be composed essentially of two sections, an upper section A and a lower section B which are held together by a dovetail joint as shown at C. These two sections constitute two separate and independent molds and one or the other can be replaced by a section or mold of different pattern when it is desired to change the form or design of the article to be produced. The lower section B is relatively fixed or stationary and will be provided with the design or ornamentation D to be pressed upon the completed article. The upper section A is most generally plain and that the article may be seamless is adapted to turn on the lower section B, and is composed of two parts which are hinged together in the ordinary manner as shown at $a$, each part being provided with a handle $a'$ by means of which the said section A can be turned and the parts readily opened and closed, the lower section B being provided with suitable ornamentation. B is constructed in three parts $b$, $b'$, $b^2$ which are hinged together, the parts $b$ and $b'$ being provided with handles $b^3$ and adapted to open outward as shown most clearly by the dotted lines in Fig. 3. In using this mold a lump of glass on the end of the blow pipe is inserted in the mold and blown until the same conforms to the interior of the said mold. The shade after being removed from the mold and detached from the blow pipe is of the form shown by the dotted lines in Fig. 4. The upper portion is heated and flared and the edges polished when the shade assumes the completed form shown by the full lines in Fig. 4. After the shade or article is blown in the mold and prior to removing the same therefrom, the upper section A is turned or revolved on the lower section to obviate the formation of seams as will be readily understood.

Fig. 5 shows a form of mold in which the upper section E is similarly constructed to the upper section of the molds shown in Figs. 1 and 2 and the lower section F is similarly constructed to the lower section B of the mold shown in Fig. 1 with the exception that the bottom G is made removable and held to the section F by a dovetail joint H. By having the bottom G removable the same may be provided with any ornamentation or projections I which will prevent the turning of the article in the mold when the upper section is turned or rotated to prevent the formation of seams, or when it is desired to provide any mark, character or design in the bottom of the article to be produced.

Fig. 6 shows the form of shade produced in the mold shown in Fig. 5.

In Fig. 7 is shown a form of mold for producing at one and the same operation two complete articles, which, in the present instance, are shades of different forms. The upper section J is adapted to revolve on the lower section K and is held to the latter by a dovetail joint M. The lower section K is made in one part and the bottom thereof is provided with projections $k$ which prevent the turning of the article when the section J is turned or rotated to obviate seams. The dotted lines indicate the portions that are broken away and between which the completed articles are formed.

Having thus described my invention, what I claim, and desire to secure by Letters Patent, is—

1. In a mold for making hollow glassware, the combination with the upper revoluble portion A, made in two sections, and having a dovetailed annular recess at the bottom of the lower portion B closed at the bottom, composed of two or more sections and provided with a dovetailed projection at the top to engage the recess of the top portion, the top portion being adapted for revolution on the bottom portion and the handles $a'$ and $b^3$ for opening, closing and revolving the portions, substantially as shown and described.

2. In a mold for making hollow glassware, the combination with an upper revoluble portion made in two sections and having a dovetailed recess in its bottom, of an intermediate portion made also in sections, and having a dovetailed projection at the top and a dovetailed recess in its bottom and a removable bottom portion having a dovetail projection and a series of projections extending upward into the mold, substantially as shown and described.

In testimony whereof I affix my signature in presence of two witnesses.

ASA G. NEVILLE.

Witnesses:
V. B. HILLYARD,
FRANK H. BURNS, Jr.